United States Patent
Hoffmann et al.

(10) Patent No.: US 6,294,732 B1
(45) Date of Patent: Sep. 25, 2001

(54) FIELD DEVICE OF THE PRESSURE-RESISTANT ENCAPSULATION TYPE OF PROTECTION

(75) Inventors: Heinfried Hoffmann, Frankfurt am Main; Lothar Kemmler, Moerfelden-Walldorf, both of (DE)

(73) Assignee: Samson Aktiengesellschaft, Frankfurt (DE)

( * ) Notice: Subject to any disclaimer, the term of this patent is extended or adjusted under 35 U.S.C. 154(b) by 0 days.

(21) Appl. No.: 09/266,130

(22) Filed: Mar. 10, 1999

(30) Foreign Application Priority Data

Mar. 10, 1998 (DE) .............................................. 198 10 350

(51) Int. Cl.$^7$ ...................................................... H01J 5/00
(52) U.S. Cl. ................................................ 174/50; 220/3.2
(58) Field of Search ................... 174/50, 17 VA; 285/203; 220/3.2, 3, 3.92, 3.94, 4.02

(56) References Cited

U.S. PATENT DOCUMENTS

| | | | |
|---|---|---|---|
| 1,882,021 | * 10/1932 | Lauer | ................................ 285/203 X |
| 2,393,581 | * 1/1946 | Wentworth | ............................. 220/3.3 |
| 4,796,159 | * 1/1989 | Miksche | ................................. 361/429 |
| 6,132,900 | * 10/2000 | Yoshizawa et al. | ................. 429/185 |

FOREIGN PATENT DOCUMENTS 26 43 187   3/1978 (DE) .
196 34 673  3/1998 (DE) .

* cited by examiner

Primary Examiner—Dean A. Reichard
Assistant Examiner—Angel R. Estrada
(74) Attorney, Agent, or Firm—Schiff Hardin & Waite

(57) ABSTRACT

The present invention is directed to an electrical field device of the pressure-resistant encapsulation type of protection for use in areas at risk of explosion and has at least a first and second mechanically and electrically coupled modules. The first module includes a connection space for the connection of the field device in an explosion-hazard area with safety barrier arranged therein and has a housing of the type of protection of the pressure-resistant encapsulation. The second module includes a field device of the self-secured type of protection and the electrical connection between the two modules comprises an arc-over-proof lead bushing, and the electrical signal connections of the second module are realized via the lead bushing.

15 Claims, 1 Drawing Sheet

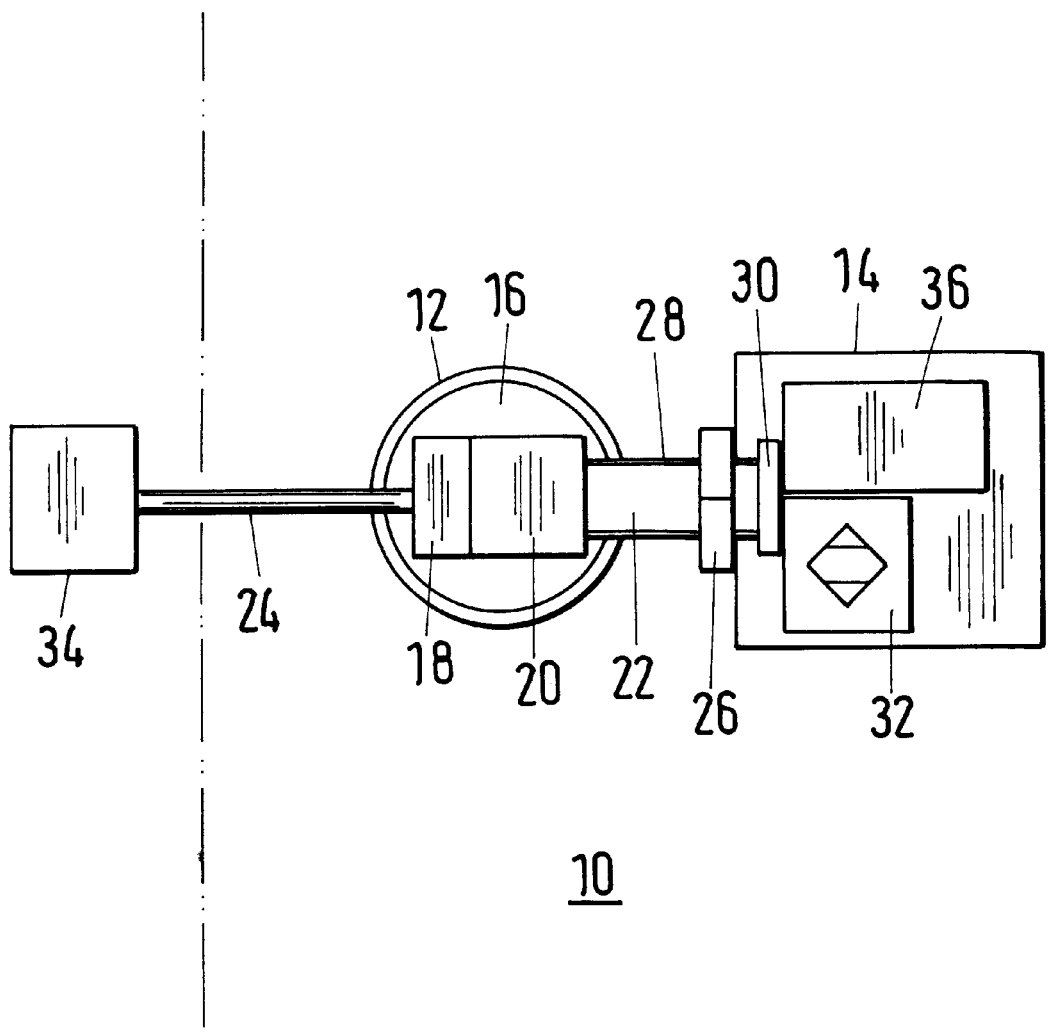

FIELD DEVICE OF THE PRESSURE-RESISTANT ENCAPSULATION TYPE OF PROTECTION

BACKGROUND OF THE INVENTION

The present invention is directed to an electrical field device of the pressure-resistant encapsulation type of protection for use in areas at risk of explosion.

Many field devices are used in areas at risk of explosion wherein, for example, combustible liquids or gasses are stored, transported and/or processed, so that the risk of an explosive atmosphere is present Special protective measures are therefore required in order to avoid a possible explosion. Two fundamentally different concepts that require both different field devices and electrical signals as well as a different installation of the lines are thereby essentially applied in the installation of field devices in such areas at risk of explosion.

Field devices according to a first concept, namely that of the self-protected type of protection having the European code system or designation and "EEx i" are mainly employed in Europe. This type of device measures, such as, for example, casting out or removing electronic components of the protective circuits of, typically, diodes and resistors assured that no energy that could trigger an explosion can arise locally even in case of damage. The energy transported on the signal lines is therefore likewise limited. The separation of the circuit into a secure area and an area at risk of explosion is realized with safety barriers or feed separators that are arranged in the secure area.

The use of field devices according to a second concept is also standard, namely that of the pressure-resistant encapsulation having the European code system "EEx d", which is widespread particularly in the USA, in Arabia and in Italy as well. A self-protected field device is thereby constructed by design measures of essentially the housing so that a spark or, respectively, a flame within the housing would also not be in the position to trigger damage outside the housing. Field devices of this second type of protection therefore usually comprise solid housings whose joints are characterized by screw threads or long, narrow gaps, and comprise displays that are protected by correspondingly thick windows of, for example, bullet-proof glass. Housings for the type of protection of pressure-resistant encapsulation "EEx d" are thus generally heavy as well as expensive and dare not be opened during operation. The installation of lines in the area at risk of explosion is thereby often provided in pipelines, whereby the pipes are then screwed to the field devices. A general limitation of the energy on the lines or a separation of the circuits into a secure area and an area at risk of explosion, however, is not required.

It is generally not desirable to utilize field devices according to the two concepts described above, namely field devices of the self-secured type of protection on the one hand and field devices of the type of protection of the pressure-resistant encapsulation on the other hand, with an area of an industrial system at ₁risk of explosion since these two different field devices, in particular, require a different installation of the lines, control boxes or, respectively, terminal housing and an operator is usually only familiar with one type of installation. Deriving therefrom for manufacturers of field devices is the difficult situation that essentially two field device types differing completely in terms of electronics and housing must be developed and manufactures, namely one per type of protection. Disadvantageously, many user-friendly properties with possibilities of paramertization and control—as known from self-secured field devices—are thereby often not realized in the design of field devices of the type of protection of the pressure-resistant encapsulation "EEx d" since operating and adjustment devices lying within the housing are generally not accessible.

Further, housings for meeting the explosion-protection demands "EEx d", i.e. of the type of protection of the pressure-resistant encapsulation "Ex d", are known for the installation of commercially available controls or electrical devices such as, for example, switches, even with the possibility for flanged attachment.

SUMMARY OF THE INVENTION

An object of the present invention is to improve the field device of the species of the type of protection of the pressure-resistant encapsulation so that it overcomes the disadvantages of the Prior Art, for example, also comprises properties of the self-secured field device, and a part of the field device can be opened for setting and maintenance purposes in the area at risk of explosion as well.

This object is inventively achieved in that the field device is composed of at least two mechanically and electrically coupled modules, whereby a first module comprises a connection space for the connection of the field device in an explosion-hazard area with safety barrier arranged therein and comprises a housing of the type of protection of the pressure-resistant encapsulation, the second module comprises a field device of the self-secured type of protection, the electrical connection between the two modules comprises an arc-over-proof lead bushing, and the electrical signal connections of the second module are realized via the lead bushing.

It can thereby be provided that the mechanical connection of the two modules is composed of a screwed connection that preferably comprises an anti-twist protection.

It is thereby inventively proposed that the lead bushing and the screwed connection are fashioned as one.

It can also be provided according to the invention that the screwed connection is realized as a pipe with an outside thread and leads are conducted through the pipe.

The lead bushing of the invention can comprise three leads, preferably three through seven leads.

One embodiment of the invention is characterized by a connecting cable for connecting the field device to a control room in a safe area and by a first connection unit in the first module for the connection of the connecting cable.

It can thereby be inventively provided that the first connection unit and the safety barrier as cast inside the first module.

It is also inventively provided that a second connection unit is arranged in the second module, and the second connection unit is connected to an electronics and operating unit.

The second module can inventively represent a position controller.

A development of the invention is characterized in that the second module contains at least one limit signal generator of the self-secured type of protection, and each limit signal generator is connected via two leads of the lead bushing.

The invention also proposes that the field device is designed for bidirectional communication via the electrical terminals in the connection space of the first module.

It can be inventively provided that the communication with the field device ensues with an average-free digital signal that can be superimposed on an analog signal, particularly ensuing according to the HART field communication protocol wherein Hart stands for Highway Addressable Remote Transducer.

Finally, it can also be inventively provided that the field device is designed as a digital process device, and the communication ensues via a digital field bus.

The invention is thus based on the surprising perception that the advantages of a field device of the type of protection of the pressure-resistant encapsulation can be united with those of a field device of the self-secured type of protection in that the field device is composed of two mechanically and electrically coupled modules, whereof the one module comprises a housing of the type of protection of the pressure-resistant encapsulation and the other module comprises a field device of the self-secured type of protection.

The inventive field device for use in explosion-hazard areas according to the type of protection of the pressure-resistant encapsulation thus makes it possible that a part of the field device can be opened for adjustment and maintenance purposes in the explosion-hazard area as well, namely the part realized as second module of the self-secured type of protection, so that the overall "EEx d" field device is advantageously largely identical to a self-secured field device.

With a correspondingly designed safety barrier, the inventive "EEx d" field device is also suited for a bidirectional communication in the same way as the self-secured field device allocated to it. The communication can thereby ensue both via a digital field bus as well as with an average-free digital signal superimposed on the analog signal such as, for example, according to the HART field communication protocol (HART=Highway Addressable Remote Transducer).

Despite the division of the inventive field device into two housings, namely two modules, an "EEx d" field device is also produced that is relatively small and lightweight since only the first module requires a pressure-encapsulated housing.

The combination of the properties of a field device of the type of protection of the pressure-resistant encapsulation with those of a field device of the self-secured type of protection means an economic advantage for the manufacturer, particularly in the case of smaller outputs, since development and tool costs are reduced and, at the same time, warehousing and distribution are clearly simplified. However, the user also profits from the inventive "EEx d" field device that, due to its low weight and the possibility of opening the housing, is especially easy to handle, particularly to install.

Further features and advantages of the invention derive from the following description in which an exemplary embodiment of the invention is explained in detail on the basis of the schematic drawing.

BRIEF DESCRIPTION OF THE DRAWING

The FIGURE shows a section through an inventive field device.

DESCRIPTION OF THE PREFERRED EMBODIMENTS

The field device 10 shown in the FIGURE is composed of two coupled modules 12, 14, whereby the first module 12 comprises a connection space 16 for the connection of the field device 10 in an explosion-hazard area with a safety barrier 20 arranged therein and comprises a housing of the type of protection of the pressure-resistant encapsulation. The field device 10 is also connected by a connecting cable 24 to a control room 34 in a safe area. A first connection unit 18 is provided in the first module 12 for the connection of this connecting cable 24, this being typically composed of a post block and being cast inside the first module 12 together with the safety barrier 20. The connecting cable 24 is introduced into the first module 12 by a standard "EEx d" screw-connection or via installation in a screwed pipeline system. The coupling of the two modules is of an electrical as well as mechanical nature and is realized via an arc-overproof lead bushing 22 that, for example, is composed of a pipe with outside thread 28 and leads cast out inside the pipe, whereby the second module 14 is protected against turning relative to the first module 12 by an anti-twist protection 26. The second module 14 represents a self-secured field device in which a second connection unit 30 that is connected with an electronics and operating unit is arranged. As a result of its self-protection, the second module can also be opened in the explosion-hazard area as needed. In addition, the second module 14 in the illustrated exemplary embodiment comprises a self-secured limit signal generator 32 that is likewise connected via the second connection unit 30 and the lead bushing 22.

The employment of one or two limit signal generators arranged within the same housing is common particularly when position controllers are utilized as field devices. The number of leads of the connecting cable 24 and of the lead bushing 22 typically lies between three and seven, whereby a self-secured two-lead devices as second module requires a minimum of three leads in order to secure a grounding for the housing in addition to the two-lead cables, and the typical case of a position controller with limit signal generators, by contrast, requires seven leads, i.e. respectively two more per limit signal generator.

Both individually as well as in arbitrary combination, the features of the invention disclosed in the above description, in the drawing as well as in the claims can be critical for realizing the various embodiments of the invention.

We claim:

1. Electrical field device of the pressure-resistant encapsulation type of protection for use in areas at risk of explosion, the field device being composed of at least first and second modules, which are mechanically and electrically coupled together, and an electrical connection therebetween, the first module having a connection space for the connection of the field device in an explosion-hazard area with a safety barrier arranged therein and having a housing of the type of protection of a pressure-resistant encapsulation, the second module having a field device of the self-secured type of protection, the electrical connection between the two modules having an arc-over-proof lead bushing, the electrical signal connections of the second module being realized via the lead bushing, a connecting cable for connecting the field device to a control room in a safe area and a first connection unit in the first module for the connection of the connecting cable.

2. Field device according to claim 1, wherein the mechanical coupling of the two modules is composed of a screwed connection.

3. Field device according to claim 2, wherein the screwed connection has an anti-twist protection.

4. Field device according to claim 2, wherein the lead bushing and the screwed connection are fashioned as one.

5. Field device according to claim 2, wherein that screwed connection is realized as a pipe with an outside thread and leads are conducted through the pipe.

6. Field device according to claim 1, wherein the lead bushing comprises at least three leads.

7. Field device according to claim 6, wherein the lead bushing has from three to seven leads, inclusive.

8. Field device according to claim 1, wherein the first connection unit and the safety barrier are cast inside the first module.

9. Field device according to claim 1, wherein a second connection unit is arranged in the second module, and the second connection unit is connected to an electronics and operating unit.

10. Field device according to claim 1, wherein the second module is a position controller.

11. Field device according to claim 1, wherein the second module contains at least one limit signal generator of the self-secured type of protection, and each limit signal generator is connected via two leads of the lead bushing.

12. Field device according to claim 1, wherein the field device is designed for bidirectional communication via electrical terminals in the connection space of the first module.

13. Field device according to claim 1, wherein a communication with the field device ensues with an average-free digital signal that can be superimposed on an analog signal according to the Highway Addressable Remote Transducer field communication protocol.

14. Field device according to claim, wherein the field device is designed as a digital process device, and a communication ensues via a digital field bus.

15. Electrical field device of the pressure-resistant encapsulation type of protection for use in areas at risk of explosion, the field device being composed of at least first and second modules, which are mechanically and electrically coupled together, and an electrical connection therebetween, the first module having a connection space for the connection of the field device in an explosion-hazard area with a safety barrier arranged therein and having a housing of the type of protection of a pressure-resistant encapsulation, the second module having a field device of the self-secured type of protection, the electrical connection between the two modules having an arc-over-proof lead bushing, the electrical signal connections of the second module being realized via the lead bushing, the second module containing at least one limit signal generator of the self-secured type of protection, and each limit signal generator being connected via two leads of the lead bushing.

* * * * *